United States Patent [19]
Pardo et al.

[11] Patent Number: 5,754,839
[45] Date of Patent: May 19, 1998

[54] APPARATUS AND METHOD FOR IMPLEMENTING WATCHPOINTS AND BREAKPOINTS IN A DATA PROCESSING SYSTEM

[75] Inventors: Ilan Pardo, Ramat-Hasahron; David Shamir, Tel-Aviv; Danny Shterman, Petach-Tikva; Itai Katz, Netanya, all of Israel; Edward C. Nelson, Ann Arbor; Mark E. Cummins, Shelby Township, both of Mich.

[73] Assignees: Motorola, Inc., Schaumburg, Ill.; Ford Motor Company, Dearborn, Mich.

[21] Appl. No.: 520,066

[22] Filed: Aug. 28, 1995

[51] Int. Cl.$^6$ ............................................. G06F 9/00
[52] U.S. Cl. .................. 395/568; 395/591; 395/183.11; 395/704
[58] Field of Search .................. 395/704, 183.1, 395/183.11, 183.14, 561, 568, 392, 800, 591, 390, 391

[56] References Cited

U.S. PATENT DOCUMENTS

| | | | |
|---|---|---|---|
| 4,429,368 | 1/1984 | Kurii | 364/580 |
| 4,635,193 | 1/1987 | Moyer et al. | 364/200 |
| 5,371,894 | 12/1994 | DiBrino | 395/800 |
| 5,537,559 | 7/1996 | Kane et al. | 395/375 |
| 5,560,036 | 9/1996 | Yoshida | 395/800 |
| 5,564,028 | 10/1996 | Swoboda et al. | 395/375 |

OTHER PUBLICATIONS

"MC88110 Second Generation RISC Microprocessors User's Manual," Motorola, 1991, pp. 7-1 to 7-6.
"Implementation of Precise Interrupts in Pipelined Processors", Smith et al., IEEE 1985, pp. 36-44.
"Implementing Precise Interruptions in Pipelined Processors RISC Processors", Wang et al., IEEE Micro, 1993, pp. 36-43.

*Primary Examiner*—Emanuel Todd Voeltz
*Assistant Examiner*—Kakali Chaki
*Attorney, Agent, or Firm*—Susan C. Hill

[57] ABSTRACT

An apparatus and method for implementing watchpoints and breakpoints in a data processing system (110). In one embodiment, a pipelined processor (110) performs each instruction of a program. One or more watchpoints are associated with the instructions. The processor includes a history buffer (50) for storing processor state values at the time when each of the instructions was executed, until a predetermined time. Watchpoint information associated with a particular watchpoint is also stored in the history buffer (50), in association with the processor state values, such that the processor state is changed and the watchpoint is announced at the predetermined time. The watchpoint information may include increment/decrement information for one or more counters (41, 42). Breakpoint information may also be stored in history buffer (50).

22 Claims, 2 Drawing Sheets

APPARATUS AND METHOD FOR IMPLEMENTING WATCHPOINTS AND BREAKPOINTS IN A DATA PROCESSING SYSTEM

FIELD OF THE INVENTION

The present invention relates in general to a data processing system, and more particularly to an apparatus and method for implementing watchpoints and breakpoints in a data processing system.

BACKGROUND OF THE INVENTION

In order to achieve maximum performance, pipelined processors have been developed which support speculative and out-of-order execution, wherein many instructions of a program are concurrently processed by the processor independent of the instruction sequence specified by the program. Instructions execute in parallel, complete out-of-order, and some are even executed speculatively in anticipation of the instruction stream going in a certain direction. The hardware if careful to ensure that this out of order operation never has an effect different than that specified by the program.

A history buffer, typically implemented as a FIFO (first-in, first-out) queue, records the relevant machine state at the time each instruction is issued. Instructions are placed on the tail of the queue when they are issued and percolate to the head of the queue while they are in execution. An instruction remains in the queue until it has completed execution and all the instructions which were issued before it have also completed execution. When the above condition is met, the instruction is released (i.e. retired) from the queue and the corresponding portion of the buffer storage is reclaimed for new instructions entering the queue.

Thus the history buffer enables the deletion of previously issued instructions in a processor which issues instructions speculatively and has out-of-order completion. If an interrupt occurs then all the instructions preceding the one causing the interrupt should be completed and retired from the history buffer. All the instructions that follow the interrupting instruction are returned to the instruction queue, and appear as if they have never been executed.

Breakpoints, when detected, force the data processor to branch to the appropriate exception handler. Watchpoints, on the other hand, do not change the timing and the flow of the data processor. Watchpoints, when detected, are usually reported external to the data processor. Watchpoints and breakpoints are used by a programmer as debugging tools within a microprocessor to signal when certain actions occur during normal execution of a computer program. For example, the programmer may arrange for a watchpoint to occur when a fetch from a particular memory address takes place. A watchpoint occurrence within a processor will typically be signaled on an external pin or bonding pad of the data processor integrated circuit.

A problem with watchpoints and breakpoints if implemented in pipelined processors is that a particular instruction which, when executed generates a watchpoint or breakpoint, may actually be speculatively executed but then later flushed (i.e. canceled) if an interrupt occurs, thereby possibly generating false watchpoints or breakpoints.

The present invention seeks to provide a pipelined processor in which the above mentioned disadvantages are mitigated.

DESCRIPTION OF THE PREFERRED EMBODIMENT

Figure 1:
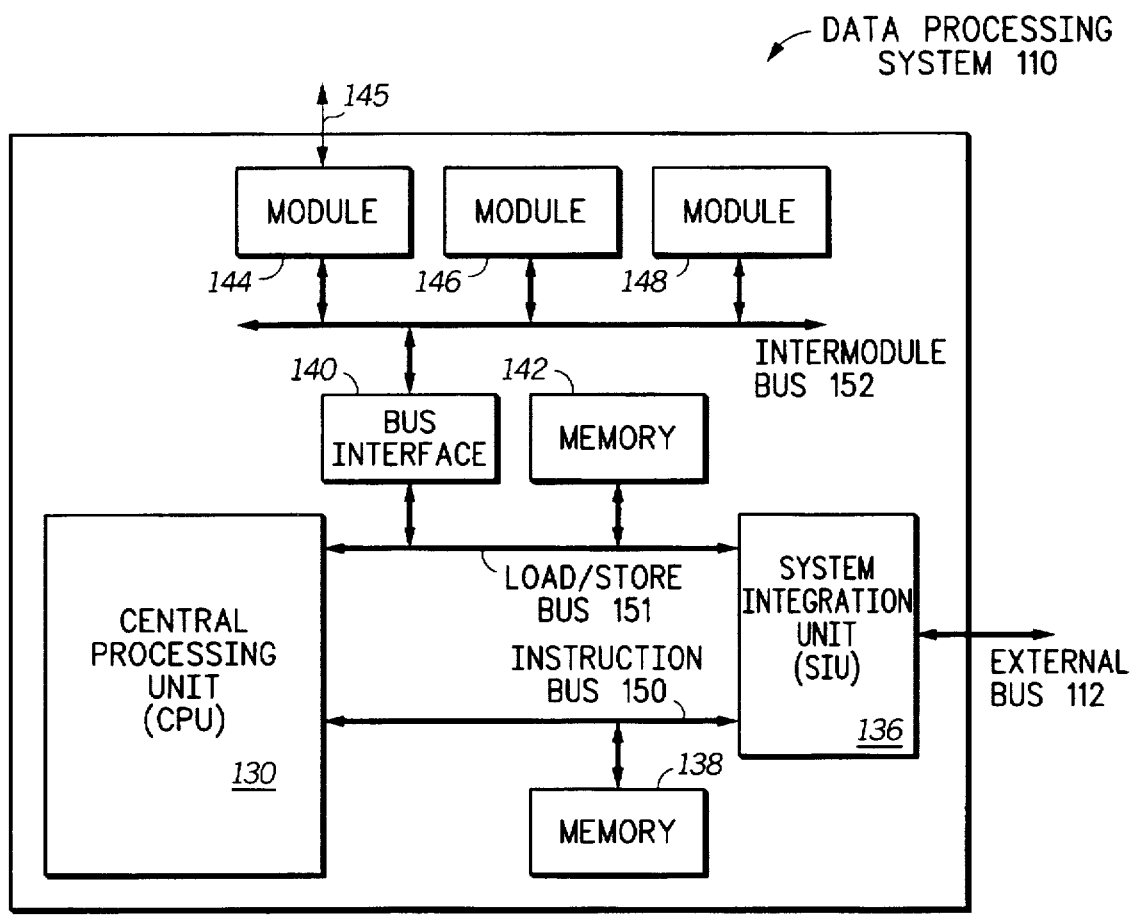
FIG. 1 illustrates, in block diagram form, a data processing system 110 in accordance with one embodiment of the present invention.

According to one embodiment of the present invention there is provided a pipelined processor in which completion of execution of instructions of a program is not necessarily in the same sequence as correct program order, where each instruction of the program has associated processor state values, and where one or more watchpoints are associated with at least one of the instructions.

The processor includes a history buffer for storing the processor state values at the time when each of a plurality of instructions was executed. The history buffer stores the state values for an instruction until a predetermined time when that instruction is either retired or flushed. The watchpoint information associated with a particular watchpoint is also stored in the history buffer in association with the processor state values such that the processor state is changed and the watchpoint is announced at a predetermined time. In one embodiment of the present invention, the predetermined time is when an instruction and all preceding instructions have been completed, which is the time that an instruction is retired from the history buffer. If an executed instruction is canceled before it is completed, preferably the watchpoint information is removed from the history buffer and is not announced.

The processor may also include logic circuitry for deriving a watchpoint condition from the instructions and for generating the watchpoint information in dependence on the watchpoint condition. The watchpoint information may include information regarding the incrementing and decrementing of watchpoint counters (e.g. counters 41 and 42 in FIG. 2), as well as information regarding whether or not a watchpoint has occurred. Alternate embodiments of the present invention may include other information as part of the watchpoint information.

In some embodiments of the present invention, the processor also includes a counter for counting the number of watchpoints, wherein each watchpoint includes a value indicative of one count. If an executed instruction having an associated watchpoint is canceled before it is completed, preferably the count associated with the watchpoint is removed from the counter.

In some embodiments of the present invention, the counter is further arranged to send breakpoint information to the history buffer when a predetermined number of counts has occurred. In addition, in some embodiments of the present invention, the counter is set to the predetermined number of counts and each counted watchpoint decrements the counter by one count. If an executed instruction having an associated watchpoint is canceled before it is completed, the counter is incremented by one count and the breakpoint information is removed from the history buffer and is not announced. In this way a particular instruction which, when executed generates a watchpoint or breakpoint, may be speculatively executed and its results later flushed (canceled) if an interrupt occurs, without generating false watchpoints or breakpoints.

DESCRIPTION OF THE FIGURES

FIG. 1 illustrates, in block diagram form, a data processing system 110 in accordance with one embodiment of the present invention. In one embodiment of the present invention, data processing system 110 has a central processing unit (CPU) 130. In one embodiment, data processing system 110 includes three internal busses, namely intermodule bus 152, load/store bus (L-bus) 151, and instruction bus (I-bus) 150. Load/store bus 151 is used to transfer data, and instruction bus 150 is used to transfer instructions. Data processing system also includes system integration unit (SIU) 136, memory 142, memory 138, and bus interface 140.

In addition, data processing system 110 includes modules 144, 146, and 148 which are all bi-directionally coupled to intermodule bus 152. Modules 144, 146, and 148 may include a timer module, a serial interface module, a memory module, an analog-to-digital conversion module, or any other type of module. One or more of Modules 144, 146, and 148 may be coupled external to data processing system 110 by way of one or more integrated circuit terminals. For example, in one embodiment of the present invention, module 144 can be used as a port which is bi-directionally coupled external to data processing system 110 by way of integrated circuit terminals 145. The integrated circuit terminals (e.g. 112, 145) used to couple data processing system to external devices (not shown) may be implemented in any desired manner, including, but not limited to, integrated circuit pins, integrated circuit bonding pads, etc.

Intermodule bus 152 and load/store bus 151 are both bi-directionally coupled to bus interface 140. Bus interface 140 is used to transfer information between intermodule bus 152 and load/store bus 151. Memory 142 is bi-directionally coupled to load/store bus 151, and memory 138 is bi-directionally coupled to instruction bus 150. Memory 138 may be any type of memory; likewise, memory 142 may be any type of memory. In alternate embodiments of the present invention, circuits 138 and 142 may be any type of module, including non-memory modules. CPU 130 is bi-directionally coupled to both load/store bus 151 and instruction bus 150. SIU 136 is bi-directionally coupled to both load/store bus 151 and instruction bus 150. SIU 136 is also bi-directionally coupled to external bus 112. In one embodiment of the present invention, data processing system 110 is formed on a single integrated circuit, and external bus 112 is used to communicate with devices (not shown) that are external to the integrated circuit.

Figure 2:
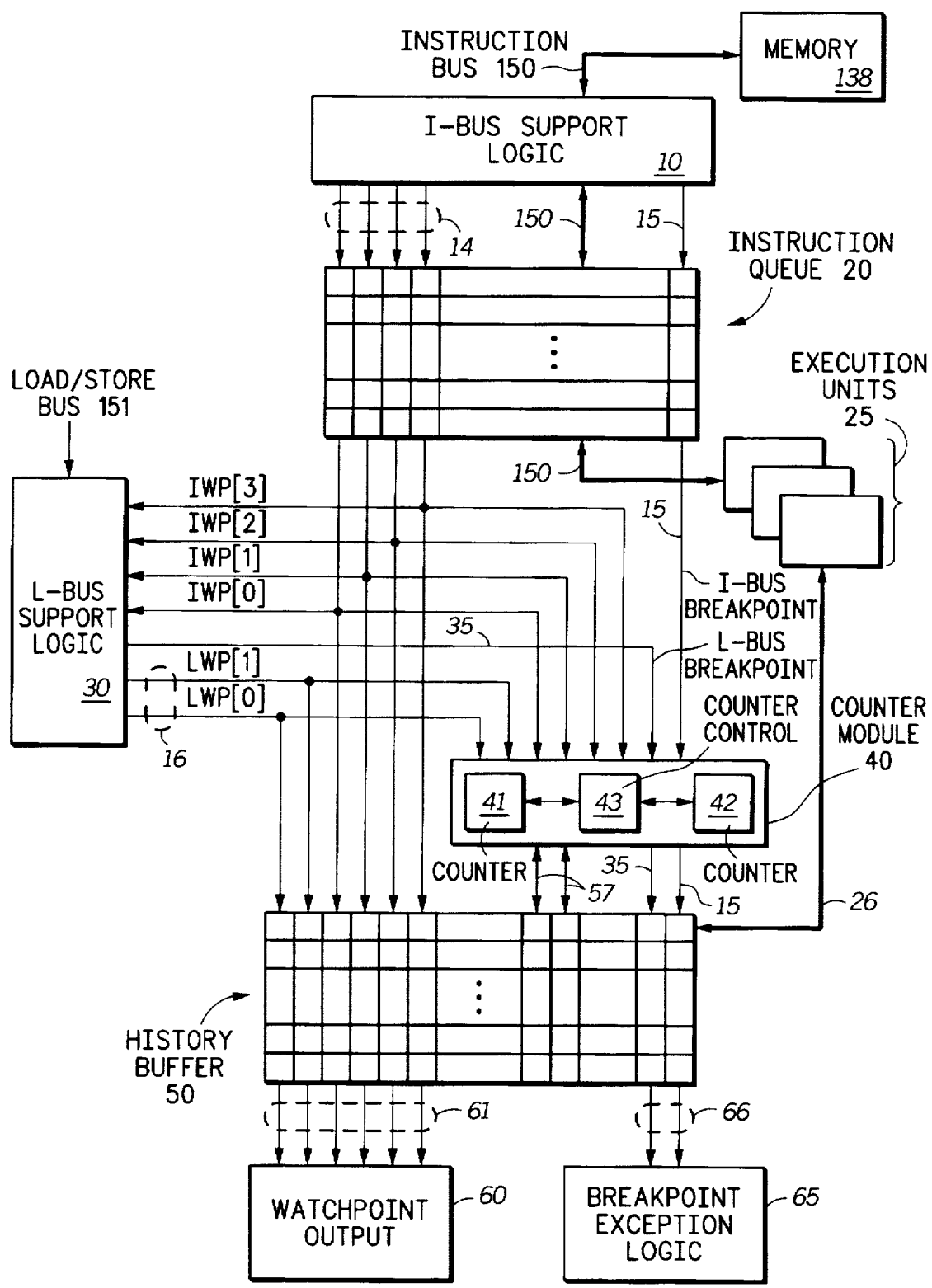
FIG. 2 illustrates, in block diagram form, a portion of data processing system 110 of FIG. 1 in accordance with one embodiment of the present invention.

FIG. 2 illustrates a portion of data processing system 110 of FIG. 1 in accordance with one embodiment of the present invention. Data processing system 110 includes memory circuitry 138, I-bus support logic circuitry 10, instruction queue circuitry 20, execution units circuitry 25, L-bus support logic circuitry 30, counter module circuitry 40, history buffer circuitry 50, watchpoint output circuitry 60, and breakpoint exception logic circuitry 65. Memory 138 is bi-directionally coupled to I-bus support logic 10 by way of instruction bus 150. I-bus support logic 10 is bi-directionally coupled to instruction queue 20 by way of at least a portion of instruction bus 150. In addition, I-bus support logic 10 is coupled to instruction queue 20 by way of a plurality of watchpoint conductors 14 and an I-bus breakpoint conductor 15.

Instruction queue 20 is bi-directionally coupled to execution units 25 by way of at least a portion of instruction bus 150. Instruction queue 20 is coupled to L-bus support logic 30, counter module 40, and history buffer 50 by way of watchpoint conductors 14. Instruction queue 20 is coupled to counter module 40 by way of I-bus breakpoint conductor 15. L-bus support logic 30 is coupled to counter module 40 and history buffer 50 by way of watchpoint conductors 16. L-bus support logic 30 is coupled to counter module 40 by way of L-bus breakpoint conductor 35.

Counter module 40 is coupled to L-bus support logic 30 by way of I-bus breakpoint indication conductor 45. Counter module 40 is coupled to history buffer 50 by way of I-bus breakpoint conductor 15 and L-bus breakpoint conductor 35. In addition, counter module 40 is bi-directionally coupled to history buffer 50 by way of a plurality of counter decrement/increment information conductors 57. History buffer 50 is bi-directionally coupled to execution units 25 by way of bus 26. History buffer 50 is coupled to watchpoint output circuitry 60 by way of conductors 61. History buffer 50 is coupled to breakpoint exception logic 65 by way of conductors 66.

In alternate embodiments of the present invention, one or more execution units 25 may be coupled to one or both of I-bus support logic 10 and L-bus support logic 30 so that one or more execution units 25 may cause watchpoints to be generated. For example, one of the execution units in execution units 25 may cause a watchpoint to be generated by providing a signal to either I-bus support logic 10 or L-bus support logic 30 when the result of an arithmetic operation in that execution unit exceeds a predetermined value.

OPERATION OF THE PREFERRED EMBODIMENT

FIG. 1 illustrates one embodiment of a data processing system 110. Although the data processing system 110 illustrated in FIG. 1 is a pipelined processor, alternate embodiments of the present invention may use any type of architecture or circuitry for data processing system 110. In some embodiments of the present invention, data processing system 110 is implemented on a single integrated circuit. In alternate embodiments of the present invention, data processing system 110 is implemented on a plurality of integrated circuits. In some embodiments of the present invention, data processing system 110 is a pipelined processor. And in some embodiments of the present invention, data processing system 110 is a RISC (Reduced Instruction Set Computer) processor.

Referring to FIG. 2, there is illustrated a block diagram of a portion of the pipelined processor 110 of FIG. 1. An instruction bus (I-bus) 150 of the processor 110 is coupled between a memory 138 and an instruction queue 20, such that instructions of a program may be fetched from the memory 138 and placed in the instruction queue 20. The instruction queue 20 has a FIFO arrangement (first-in, first-out) and sequentially stores the instructions in the order they are received from the memory 138.

I-bus support logic 10 is coupled to the instruction bus 150 between the memory 138 and the instruction queue 20. The I-bus support logic 10 provides and controls the assertion and negation of an I-bus breakpoint conductor 15, and a number of I-bus watchpoint conductors 14 (labeled IWP [0], IWP[1], IWP[2], and IWP[3]), which are coupled to the instruction queue 20. The I-bus support logic 10 may be configured to assert one or more of the I-bus watchpoint signals 14 when certain predetermined activity occurs on the instruction bus 150. The configuration of the I-bus support logic 10 may be performed in software, in hardware, or in a combination of software and hardware, depending upon the particular embodiment of data processing system 110 which is used.

The I-bus watchpoint conductors 14 are also coupled to L-bus support logic 30. The L-bus support logic 30 is coupled to a load/store bus (L-bus) 151 for generating L-bus watchpoint signals 16 (labeled LWP[0] and LWP[1]). The L-bus support logic 30 may be configured to assert one or more of the L-bus watchpoint signals 16 when certain activity occurs on the load/store bus 151. The configuration of the L-bus support logic 30 may be performed in software, in hardware, or in a combination of software and hardware, depending upon the particular embodiment of data processing system 110 which is used. In addition to controlling the activities of L-bus watchpoint conductors 16 (i.e. LWP[0] and LWP[1]), the L-bus support logic 30 also controls the assertion and negation of an L-bus breakpoint conductor 35.

One or more execution units 25 are coupled to the instruction queue 20. The execution units 25 receive the instructions from the instruction queue 20 and carry out execution of the instructions. In alternate embodiments of the present invention, the conductors 150 coupled between I-bus support logic 10 and instruction queue 20 may include all or only a portion of the full set of instruction bus conductors 150 coupled between memory 138 and I-bus support logic 10. Likewise, the conductors 150 coupled between instruction queue 20 and execution units 25 may include all or only a portion of the full set of instruction bus conductors 150 coupled between memory 138 and I-bus support logic 10.

A history buffer 50 is coupled to receive and provide state information from and to execution units 25 by way of conductors 26. History buffer 50 also receives I-bus watchpoint conductors 14 and L-bus watchpoint conductors 16. The history buffer 50 provides watchpoint signals 61 to watchpoint output circuitry 60 (which typically includes integrated circuit bonding pads or integrated circuit pins). In alternate embodiments of the present invention, watchpoint output circuitry 60 may be any type of conductor used to provide a watchpoint signal external to data processing system 110. The history buffer 50 also provides breakpoint signals 66 to breakpoint exception logic 65, to be further explained below.

A counter module 40, containing one or more counters, is coupled to receive the I-bus watchpoint conductors 14, the L-bus watchpoint conductors 16, the I-bus breakpoint conductor 15 and the L-bus breakpoint conductor 35. The counter module 40 is also coupled to provide an I-bus breakpoint indication conductor 45 to the L-bus support logic 30. The counter module 40 is also arranged to provide breakpoint indications to the history buffer 50 via breakpoint indication conductors 15 and 35. Counter decrement and increment indications are also passed between the counter module 40 and the history buffer 50 via counter indication conductors 57. The function and purpose of these conductors will be further described below.

In operation, instructions are fetched from the memory 138 into the instruction queue 20. A programmer wishing to know when a particular instruction is fetched sets up a watchpoint on the memory address containing that instruction. This is done by programming the I-bus support logic 10 to recognize a fetch from that particular memory address. Note that I-bus support logic 10 uses well known comparator circuitry. When the particular address fetch occurs, the I-bus support logic 10 generates a watchpoint indication on one of the watchpoint conductors 14, for example IWP[0]. Thus I-bus watchpoints are originated in the I-bus support logic 10, and indicated by the watchpoint indications on the watchpoint conductors 14.

The I-bus watchpoint indication is stored with its associated instruction (i.e. the instruction that gave rise to it) in the instruction queue 20. In this way I-bus watchpoints are not generated immediately following the fetch, but are stored alongside their associated instructions in the instruction queue 20. The instruction at the head of the instruction queue 20 is issued to the next available one of the execution units 25, at which point it and any watchpoint indications associated with it are moved from the instruction queue 20 to the history buffer 50. When a watchpoint occurrence indication is moved from the instruction queue 20 to the history buffer 50, a corresponding count decrement indication is also transferred from the counter module 40 to history buffer 50. The watchpoint occurrence indication and the corresponding count decrement indication are stored together in the history buffer with the associated instruction that caused the watchpoint.

L-bus watchpoints, which originate in the L-bus support logic 30, give rise to watchpoint indications which are placed on the L-bus watchpoint conductors 16. Any L-bus watchpoint occurrence indications associated with a particular instruction are also stored in history buffer 50 alongside the associated instruction. In alternate embodiments of the present invention, the watchpoint occurrence indication and the counter increment/decrement indication may be combined into one value that is stored in history buffer 50. Counter control circuitry 43 may then use this one combined value to determine which one, if any, of counters 41 or 42 needs to be incremented/decremented when an instruction is flushed from history buffer 50.

Breakpoints which are used to halt the execution of the program, are typically generated when a predetermined number of watchpoints have occurred. They may be generated by the I-bus support logic 10 (in which case they are indicated on the I-bus breakpoint conductor 15), by the L-bus support logic 30 (in which case they are indicated on the L-bus breakpoint conductor 35), or by the counter module 40. In one embodiment of the present invention, counter module 40 includes a counter 41 and a counter 42. In some embodiments of the present invention, counters 41 and 42 operate independently of each other. Alternate embodiments of the present invention may use only one counter, or may alternately use any number of counters, which may function independently or which may affect each other.

Each one of counters 41 and 42 may be programmed to count different watchpoints; for example, counter 41 may be programmed to count all I-bus watchpoints and counter 42 may be programmed to count only L-bus watchpoints on LWP[1]. Counter control circuitry 43 decrements the corresponding counter 41, 42 at each occurrence of the programmably selected watchpoint. When a counter 41, 42 is decremented to zero, counter control circuitry 43 generates a breakpoint indication on conductors 66.

Alternate embodiments of the present invention may increment counters 41 and 42 to a predetermined value, rather than decrementing counter 41 and 42 to zero. In addition, alternate embodiments of the present invention may use a rollover of counters 41 and 42 to indicate that the desired number of watchpoints has been reached and that a breakpoint is to be generated on conductors 66.

In a pipelined processor, the execution of instructions may take place in parallel and instructions are not necessarily completed in the same order as they are arranged in a computer program. Furthermore, an instruction may require that the next instruction to be issued must be one other than the next instruction in the queue. The next instruction in the queue may already have been issued to one of the execution units, so this must be undone. The history buffer 50 facilitates this "undoing" by allowing instructions to be flushed and any changes resulting from the instruction (such as a change in register contents) to be discarded. When an instruction is flushed from the history buffer, the data processing system 110 behaves as if the instruction was never issued. This is achieved by returning the data processing system 110 to the machine state it had before execution of the flushed instruction was begun. The history buffer 50 stores the machine state information needed to return the data processing system 110 to the state it had before the instruction was begun.

In a non-pipelined processor, watchpoints and breakpoints would be signaled to the programmer immediately. However, in data processing system 110, where instructions are not necessarily completed in program order, an instruction may be fetched and issued, thus possibly generating a watchpoint and/or breakpoint, but subsequently be flushed from the history buffer 50 (meaning that the processor 110 has effectively undone the fetch and issue of that instruction). If a watchpoint or breakpoint was signaled at fetch or issue time in a pipelined processor, it may subsequently prove to have been wrongly signaled.

Therefore, in the processor 110, the watchpoint indications on the watchpoint conductors 14 (i.e. IWP[0], IWP[1], IWP[2], and IWP[3]) and the breakpoint indication on the I-bus breakpoint conductor 15 are carried with the instructions as each instruction move through the instruction queue 20. Also, the watchpoint indications on the watchpoint conductors 14 and the breakpoint indication on the I-bus breakpoint conductor 15 are carried on through with each instruction in the history buffer 50, together with the additional information of the watchpoint indications on the watchpoint conductors 16 (i.e. LWP[0] and LWP[1]) and the breakpoint indication on the L-bus breakpoint conductor 35. In addition, counter module 40 provides counter count down indications which are provided to history buffer 50 by way of conductors 57. The counter count down indications are also carried on through with each instruction in the history buffer 50. In one embodiment of the present invention, there is a separate conductor 57 and indicator bit stored in history buffer 50 for each counter in counter module 40. Alternate embodiments of the present invention may use more or fewer bits, or may encode the counter decrement/increment information into any number of bits.

The history buffer 50 maintains each instruction and any associated watchpoint and breakpoint indications and any associated counter increment/decrement information until the instruction is completed by one of the execution units and all preceding instructions in the program are also completed. The instruction is then retired from the history buffer 50, any associated watchpoint indications are output to the watchpoint output 60, and any breakpoint indications are output to the breakpoint exception logic 65.

Thus an instruction is only retired from the history buffer 50 when there is no longer the possibility that it may be flushed out by a preceding instruction which has not yet completed. Hence a watchpoint is only signaled to the programmer once it is certain that its associated instruction will not be flushed from the history buffer 50. This prevents a watchpoint from being falsely signaled.

As previously mentioned, breakpoints are managed by the counters 41, 42 within the counter module 40. Each counter 41, 42 may be configured using programmable registers (not shown) in counter control circuitry 43 so that a programmably selected number of watchpoints may be required to trigger a breakpoint. For example, if counter 41 has been configured to count all IWP[2] watchpoints, and that particular watchpoint IWP[2] is encountered by counter module 40, then counter 41 is decremented by one. And if counter 41 has been configured to cause an I-bus breakpoint after receiving three sequential watchpoints on IWP[2], then counter 41 will be decremented to zero after the third watchpoint on IWP[2] has been received.

When counter 41 is decremented to zero, a breakpoint indication is sent via the corresponding breakpoint conductor (I-bus breakpoint conductor 15 in this example) to the history buffer 50, where it is stored alongside the associated instruction. If that instruction is subsequently flushed from the history buffer 50, counter 41 is re-incremented by one, via the counter indication conductors 57. That is, history buffer 50 provides the counter decrement/increment information to counter control circuitry 43 by way of one or more conductors 57. Counter control circuitry 43 then determines which, if any, of the counters 41, 42 need to be incremented to account for the fact that an instruction is being flushed.

Thus, if the issuing of an instruction causes a watchpoint and results in a counter 41, 42 being decremented, then the flushing of that same instruction from history buffer 50 will result in a counter 41, 42 being incremented. Thus the values stored in counters 41, 42 are corrected when instructions are flushed from the history buffer 50, and breakpoints only occur when the required number of watchpoints associated with retired instructions have occurred. Counter control circuitry 43 handles the decrementing of counters 41 and 42 based upon which watchpoint occurrence indications have been received on conductors 14 and 16. Counter control circuitry 43 also provides this counter decrement/increment information to history buffer 50 to be stored with the associated instruction that caused the watchpoint. If that same instruction is then flushed from history buffer 50, the counter control circuitry 43 handles the incrementing of counters 41 and 42, based upon the counter decrement/increment information received from history buffer 50 by way of conductors 57.

Continuing with the example, when counter 41 counts down to zero and the instruction associated with the zero count is retired from the history buffer 50, a breakpoint signal is provided to the breakpoint exception logic 65 by way of conductors 66. In response to receiving a breakpoint signal from history buffer 50, breakpoint exception logic 65 performs an exception routine appropriate for the breakpoint which has occurred.

Therefore, in the present invention, the watchpoint and breakpoint indications do not change the fetch, issue, execution or retirement of instructions. The extra tasks associated with watchpoints and breakpoints that are due to the pipelined nature of data processing system 110 are handled in parallel with any required flushing of instructions from history buffer 50. As a result, the operation of data processing system 110 when running a software program is negligibly impacted by the use of watchpoint and breakpoint functions.

While the present invention has been illustrated and described with reference to specific embodiments, further modifications and improvements will occur to those skilled in the art. For example, the number of watchpoint conductors IWP[0], IWP[1], IWP[2], IWP[3], LWP[0], LWP[1] and the breakpoint conductors 15 and 35 could differ according to the amount of functionality required. It is to be understood, therefore, that this invention is not limited to the particular forms illustrated and that it is intended in the appended claims to cover all modifications that do not depart from the spirit and scope of this invention.

We claim:

1. A data processing system, comprising:
   an execution unit for executing an instruction having an associated watchpoint; and
   a history buffer, coupled to said execution unit, said history buffer comprising:
      a first storage portion for storing processor state information for returning said execution unit to a predetermined state if the instruction is flushed from said history buffer; and
      a second storage portion for storing watchpoint information corresponding to the instruction;
   wherein said data processing system further comprises a means for providing the associated watchpoint external to said data processing system if the instruction is retired from said history buffer, said means not providing the associated watchpoint external to said data processing system if the instruction is flushed from said history buffer.

2. A data processing system as in claim 1, further comprising:
   an instruction storage circuit, coupled to said execution unit, for storing the instruction and for storing a second instruction.

3. A data processing system as in claim 2, further comprising:
   logic means for determining if there is a second watchpoint associated with the second instruction, and if there is the second watchpoint associated with the second instruction said logic means generating a watchpoint occurrence indication for the second instruction, said logic means being coupled to said instruction storage circuit.

4. A data processing system as in claim 3, further comprising:
   counter logic, coupled to said history buffer, said counter logic storing a count value that is modified in response to receiving the watchpoint occurrence indication for the second instruction, said counter logic providing counter modification information to said history buffer.

5. A data processing system as in claim 4, wherein said counter logic comprises:
   a first counter circuit;
   a second counter circuit; and
   counter control circuitry, coupled to said first and second counter circuits.

6. A data processing system as in claim 1, further comprising:
   a counter, coupled to said history buffer, said history buffer providing the watchpoint information to said counter when the instruction is flushed from said history buffer.

7. A data processing system as in claim 6, wherein if the instruction is canceled before the instruction has been retired from said history buffer, a count value associated with the watchpoint is removed from the counter.

8. A data processing system as in claim 6, wherein said counter stores a count value which is modified in response to receiving the watchpoint information from said history buffer.

9. A data processing system as in claim 6, wherein the counter is set to a predetermined number of counts and each counted watchpoint decrements said counter by one count.

10. A data processing system as in claim 9, wherein if the instruction is canceled before the instruction has been retired from said history buffer, said counter is incremented by one count.

11. A data processing system as in claim 6, wherein said counter provides breakpoint information to said history buffer when a predetermined number of counts has occurred.

12. A data processing system as in claim 11, wherein if the instruction is canceled before the instruction has been retired from said history buffer, the breakpoint information is removed from the history buffer and a breakpoint is not announced.

13. A data processing system as in claim 12, wherein if the instruction completes execution, the breakpoint is announced.

14. A data processing system as in claim 13, wherein if the instruction retires from said history buffer, the breakpoint information is removed from said history buffer.

15. A data processing system as in claim 14, wherein said data processing system comprises a pipelined processor.

16. A data processing system as in claim 14, wherein said data processing system comprises a reduced instruction set (RISC) processor.

17. A data processor, comprising:
   a first storage circuit for storing a plurality of instructions;
   an execution unit, coupled to said first storage circuit, for executing the plurality of instructions;
   a watchpoint output circuit; and
   a second storage circuit, coupled to said execution unit and to said watchpoint output circuit, said second storage circuit storing a plurality of processor state values which correspond to the plurality of instructions, wherein each one of the plurality of processor state values is associated with a corresponding one of the plurality of instructions, wherein each one of the plurality of processor state values includes a first portion for returning the execution unit to a previous state as if the corresponding one of the plurality of instructions had never been executed, and each one of the plurality of processor state values includes a second portion for providing watchpoint information wherein the watchpoint information determines whether a watchpoint is provided to said watchpoint output circuit when the corresponding one of the plurality of instructions is retired from the second storage circuit.

18. A method for operating a data processor, the data processor having an execution unit and having a buffer for storing processor state information, the data processor executing a program having a plurality of instructions in sequential order, the plurality of instructions in sequential order having a plurality of prior instructions and having a present instruction, the method comprising the steps of:
   receiving the present instruction;
   determining if a watchpoint is associated with the present instruction;
   storing a first processor state value in the buffer, said first processor state value corresponding to the present instruction; and
   if the watchpoint is associated with the present instruction, storing a watchpoint occurrence indication value in the buffer;
   determining that the present instruction has completed execution and that the plurality of prior instructions have also completed execution;
   issuing the watchpoint after said step of determining that the present instruction has completed execution and that the plurality of prior instructions have also completed execution.

19. A method for operating a data processor as in claim 18, further comprising the step of:

providing the watchpoint occurrence indication value to a counter circuit.

20. A method for operating a data processor as in claim 19, wherein the watchpoint occurrence indication value is provided to the counter circuit when the present instruction is flushed from the buffer.

21. A method for operating a data processor as in claim 19, further comprising the step of:

if the watchpoint is associated with the present instruction, adjusting a count value in the counter circuit in response to the watchpoint occurrence indication value.

22. A method for operating a data processor as in claim 21, wherein said step of adjusting comprises the step of incrementing the counter circuit.

* * * * *